(12) United States Patent
Hennige et al.

(10) Patent No.: US 7,351,494 B2
(45) Date of Patent: Apr. 1, 2008

(54) ELECTRIC SEPARATOR, METHOD FOR PRODUCING THE SAME AND THE USE THEREOF

(75) Inventors: Volker Hennige, Duelmen (DE); Christian Hying, Rhede (DE); Gerhard Hoerpel, Nottuln (DE)

(73) Assignee: Degussa AG, Duesseldorf (DE)

( * ) Notice: Subject to any disclaimer, the term of this patent is extended or adjusted under 35 U.S.C. 154(b) by 434 days.

(21) Appl. No.: 10/487,245

(22) PCT Filed: Aug. 20, 2002

(86) PCT No.: PCT/EP02/09266

§ 371 (c)(1),
(2), (4) Date: Sep. 20, 2004

(87) PCT Pub. No.: WO03/021697

PCT Pub. Date: Mar. 13, 2003

(65) Prior Publication Data

US 2005/0031942 A1 Feb. 10, 2005

(30) Foreign Application Priority Data

Aug. 31, 2001 (DE) ............................... 101 42 622

(51) Int. Cl.
*H01M 2/16* (2006.01)
(52) U.S. Cl. ..................................... 429/129
(58) Field of Classification Search ................. None
See application file for complete search history.

(56) References Cited

U.S. PATENT DOCUMENTS

| | | | |
|---|---|---|---|
| 3,816,242 A | 6/1974 | Selover et al. | |
| 5,455,206 A | 10/1995 | Kaun | |
| 5,512,359 A * | 4/1996 | Leung et al. | 428/294.1 |
| 5,885,657 A | 3/1999 | Penth | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 | 9/2003 | Hying et al. | |
| 6,841,075 B2 | 1/2005 | Penth et al. | |
| 2002/0023419 A1 | 2/2002 | Penth et al. | |
| 2002/0039648 A1 | 4/2002 | Horpel et al. | |
| 2004/0028913 A1 | 2/2004 | Hennige et al. | |
| 2004/0038105 A1 | 2/2004 | Hennige et al. | |
| 2004/0262169 A1 | 12/2004 | Hying et al. | |
| 2005/0031942 A1 | 2/2005 | Hennige et al. | |
| 2005/0087491 A1 | 4/2005 | Hennige et al. | |

FOREIGN PATENT DOCUMENTS

| | | |
|---|---|---|
| EP | 0 121 771 | 10/1984 |
| WO | 99 15262 | 4/1999 |
| WO | 99 57769 | 11/1999 |
| WO | WO 02/47801 A1 * | 6/2002 |

OTHER PUBLICATIONS

U.S. Appl. No. 10/487,245, filed Feb. 27, 2004, Hennige et al.
U.S. Appl. No. 10/501,713, filed Jul. 19, 2004, Hennige et al.
U.S. Appl. No. 10/504,144, filed Aug. 19, 2004, Hennige et al.
U.S. Appl. No. 10/487,245, filed Sep. 20, 2004, Hennige et al.
U.S. Appl. No. 10/519,097, filed Dec. 27, 2004, Hennige et al.
U.S. Appl. No. 10/524,669, filed Feb. 11, 2005, Hennige et al.
U.S. Appl. No. 10/524,145, filed Feb. 11, 2005, Hennige et al.
U.S. Appl. No. 10/524,143, filed Feb. 11, 2005, Hennige et al.
U.S. Appl. No. 10/575,734, filed Apr. 13, 2006, Hoerpel et al.
U.S. Appl. No. 10/575,759, filed Apr. 13, 2006, Hennige et al.
U.S. Appl. No. 10/575,268, filed Apr. 11, 2006, Hennige et al.
U.S. Appl. No. 10/575,274, filed Apr. 11, 2006, Hennige et al.
U.S. Appl. No. 11/578,664, filed Oct. 18, 2006, Hoerpel et al.
U.S. Appl. No. 10/588,952, filed Aug. 10, 2006, Nun et al.
U.S. Appl. No. 11/577,542, filed Apr. 19, 2007, Hoerpel et al.

* cited by examiner

*Primary Examiner*—Susy Tsang-Foster
*Assistant Examiner*—Cynthia Lee
(74) *Attorney, Agent, or Firm*—Oblon, Spivak, McClelland, Maier & Neustadt, P.C.

(57) ABSTRACT

A separator based on a sheetlike flexible substrate having a multiplicity of openings and having a coating on and in the substrate, the material of the substrate being selected from woven or non-woven electrically nonconductive fibers of glass or ceramic or a combination thereof and the coating being a porous electrically insulating ceramic coating, characterized by a thickness of less than 100 μm; a process for producing the separator; and a battery comprising the separator.

20 Claims, No Drawings

ELECTRIC SEPARATOR, METHOD FOR PRODUCING THE SAME AND THE USE THEREOF

An electric separator is a separator used in batteries and other arrangements in which electrodes have to be separated from each other while maintaining ion conductivity for example.

The separator is a thin porous insulating material possessing high ion permeability, good mechanical strength and long-term stability to the chemicals and solvents used in the system, for example in the electrolyte of the battery. In batteries, the separator should fully electronically insulate the cathode from the anode. Moreover, the separator has to be permanently elastic and to follow movements in the system, for example in the electrode pack in the course of charging and discharging.

The separator is a crucial determinant of the use life of the arrangement in which it is used, for example battery cells. The development of a rechargeable battery having a lithium electrode (negative mass) is desirable. However, commercially available separators are not suitable for that purpose.

General information about electric separators and lithium ion batteries may be found for example at J. O. Besenhard in "Handbook of Battery Materials"; VCH-Verlag, Weinheim 1999, (chapter 10 pages 553 et seq.) and at Wakihara and Yamamoto in "Lithium Ion Batteries" Wiley-VCH-Verlag, Weinheim 1998.

Separators currently used in lithium ion cells (batteries) predominantly consist of porous organic polymer films. These are produced by various companies either by the dry process or by the wet process. The most important producers are Celgard, Tonen, Ube, Asahi and Mitsubishi.

The lithium ion cell separators produced by these companies are all based on the polyolefins polyethylene (PE) or polypropylene (PP). These are also the separator materials present in all commercially available lithium batteries. Incidentally, here and hereinafter, the term "batteries" comprehends secondary and primary lithium battery systems.

Other possible separator materials are nonwovens composed of glass or ceramic materials or else ceramic papers. However, these materials have poor machine processing properties and so are not used at present in any commercially available battery systems.

Disadvantages of organic polyolefin separators are their relatively low thermal stability limit of distinctly below 150° C. and also their low chemical stability in inorganic battery cells. When used in lithium batteries, polyolefins are gradually attacked by the lithium. In systems comprising a polymer electrolyte, a dense oxidation product layer is formed. It prevents further destruction of the separator in lithium ion batteries.

High energy batteries or high performance batteries can simply not be fabricated using polymer electrolytes, since their conductivity is too low at the operating temperatures in question. These battery systems utilize nonaqueous and nonpolymeric electrolytes such as for example liquid sulfur dioxide. Polymeric separators are not chemically stable in these electrolytes, being destroyed after some time. These systems therefore utilize inorganic separators (glass mat, ceramic mat and ceramic paper) having the familiar disadvantages. These are in particular that inorganic ceramic or glass mats cannot be machine processed into wound cells, since they always break at the given pulling tensions. Ceramic papers are very brittle and cannot be wound or processed into wound cells for that reason. Utility is therefore restricted to the production of prismatic cells, where the electrodes/separators are not wound but stacked. Nor is it necessary in this arrangement for the materials to have breaking strength.

There have been initial attempts to use inorganic composite materials as separators. For instance, DE 198 38 800 encompasses an electric separator comprising a sheetlike flexible substrate having a multiplicity of openings and having a coating on said substrate, the material of said substrate being selected from metals, alloys, plastics, glass and carbon fiber or a combination thereof and said coating being a twodimentionally continuous porous, electrically nonconducting ceramic coating. The separators, which have a support of electrically conductive material (as reported in the example), however, have been determined to be unsuitable for lithium ion cells, since the coating cannot be produced over a large area without flows at the thickness described and consequently short circuits can occur very easily. A polymeric support, in contrast, dissolves, since the electrolyte comes into contact with the substrate.

It can be stated in summary that there is at present no suitable separator material for producing wound inorganic high performance or high energy batteries in an economical manner.

It is an object of the present invention to provide a flexible, robust separator for high performance and high energy batteries that has a low resistance in conjunction with the electrolyte, is bendable and is machine processible into wound cells. It shall moreover possess correspondingly good long-term stability in inorganic battery systems to all battery components (electrolytes, conducting salts, overcharge products or lithium and the like).

It was found that, surprisingly, an electric separator comprising a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating, and which has a thickness of less than 100 μm and is bendable, has a sufficiently low resistance in conjunction with the electrolyte and yet possesses sufficient long-term stability.

The present invention accordingly provides an electric separator, comprising a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating, characterized by a thickness of less than 100 μm.

The present invention likewise provides a process for producing a separator, which comprises providing a sheetlike flexible substrate having a multiplicity of openings with/and a coating on or in said substrate, the material of said substrate being selected from woven or non-woven electrically nonconductive fibers of glass or ceramic or a combination thereof and said coating being a porous electrically insulating ceramic coating.

In general, the larger the pores, the lower the resistance which ensues.

Moreover, the porosity of the separator can be influenced through the choice of suitable particles, and this similarly leads to modified properties. A separator parameter which is frequently quoted in this context is the Gurley number. It is a measure of the gas permeability of the dry porous separator. As described by O. Besenhard in the Handbook of Battery Materials, the conductivity of a known system can be inferred directly from the Gurley number. In generalized terms, a higher gas permeability (Gurley number) will result in a higher conductivity for the wetted separator in the battery cell. The Gurley numbers of commercially available separators range from 10, when the pore diameter is around 0.1 µm, to 30, when the pore diameter is around 0.05 µm (G. Venugopal; J. of Power Sources 77 (1999) 34-41).

However, it must always be borne in mind that an extremely large Gurley number can also be evidence of defects, ie large holes, in the separator. These defects can lead to an internal short circuit in operation of a battery. The battery can then very rapidly self-discharge in a hazardous reaction. In the process, large electric currents occur that may even cause a contained battery cell to explode in the extreme case. For this reason, the separator can make a decisive contribution to the safety, or lack of safety, of a lithium battery. Therefore, the separator is a decisive structural component of a battery and deserving of a great deal of attention.

Polymeric separators do provide the safety performance required at present by impeding any ionic transport between the electrodes beyond a shutdown temperature, which is about 120° C. This is because, at this temperature, the pore structure of the separator collapses and all the pores close up. As a result of ionic transport being stopped, the hazardous reaction which can lead to an explosion ceases. However, if the cell is further heated owing to external circumstances, the breakdown temperature is exceeded at about 150 to 180° C. At this temperature, the separator starts to melt and contract. The two electrodes then come into direct contact at many locations in the battery cell and so there is an internal short circuit over a large area. This leads to an uncontrolled reaction which ends with the cell exploding, or the resultant pressure is released by an overpressure valve (a bursting disk), frequently with signs of fire.

The inorganic separator of the invention does not give rise to these two effects. This has the advantage that battery cells can be operated at higher temperatures without their shutting down or posing a safety hazard as a result. The inorganic separator cannot melt and so can never give rise to a large-area internal short circuit in a cell either.

The same applies to an internal short circuit due to an accident. If, for example, a nail were to puncture a battery, the following would happen according to the type of separator:

A polymeric separator would melt at the site of puncture (a short circuit current flows through the nail and causes it to heat up) and contract. As a result, the short circuit location would increase in size and the reaction would run away. The inorganic separator of the invention would not melt. So the reaction in the interior of the cell following such an accident would proceed very much more moderately. This cell is thus distinctly safer than one with a polymeric separator. This is an important factor especially in the transportation sector, such as the automotive sector.

Higher permitted operating temperatures are not necessary nor desirable for lithium batteries in applications such as notebooks, notepads or cellphones. The situation is different in the transportation sector, however.

The automotive industry is trying to contribute to environmental and resource conservation by increasingly reducing motor fuel consumption. A relatively efficient method in this connection is the intermediate storage of braking energy. This can be done by returning the braking energy to the battery in the case of hybrid vehicles, which have a battery-operated electrical drive as well as a fuel cell and a gasoline, diesel or any other engine, or in the case of electric vehicles. Very large amounts of energy are introduced within very short times, which can lead to a short sharp increase in battery temperature. In the case of the use of polymeric separators, the return feed can only take place when the temperature of every cell is very closely monitored and the feeding is interrupted when a relatively low temperature limit is exceeded. When an inorganic separator is used, there is no need for an interruption, since the high temperature does not have adverse effects on the separator. As a result, the entire braking energy can be fed into the battery, and not just a part as in the case of polymeric separators. The situation is similar with the rapid chargeability of batteries containing an inorganic separator, as will be appreciated. They are rapidly chargeable. This is a distinct advantage in the case of use in electric vehicles, since these no longer have to be charged over 12 h or even longer time periods; instead charging is feasible within distinctly shorter periods.

Owing to the thickness of less than 100 µm for the electric separators of the present invention, the electric resistance on using the separator is distinctly lower than in the case of separators known to date. Despite the low thickness, the separator according to the invention possesses sufficient strength (breaking strength) of more than 10 N, preferably of more than 25 N and most preferably of more than 50 N and is flexible. The breaking strength of commercially available polymeric separators is about 50 N in the machine direction and 5 N in the cross direction (G. Venugopal; J. of Power Sources 77 (1999) 34-41).

The separator according to the invention will now be described without the invention being limited thereto.

The electric separators of the invention comprise a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating. The separator has a thickness of less than 100 µm, preferably of less than 75 µm and most preferably of less than 50 µm.

The low thickness provides a particularly low electric resistance for the separator in use with an electrolyte. The separator itself, of course, has an infinitely large resistance, since it itself must have insulating properties.

In order that a separator having insulating properties may be obtained, the material for the substrate preferably comprises electrically nonconductive fibers selected from glass, alumina, $SiO_2$, SiC, $Si_3N_4$, BN, $B_4N$, AlN, sialons or $ZrO_2$.

The material of the substrate can be a woven, nonwoven or felt of electrically nonconductive fibers. In order that a uniform resistance may be obtained in use with an electrolyte, the material of the substrate is preferably a glass fiber fabric uniformly woven from glass fibers. This provides uniform resistance in use with an electrolyte, based on the surface area of the separator. When a non-woven glass fiber material is used, it may happen that the separator surface has regions having a larger resistance in use with the electrolyte and other regions having a smaller resistance in use with the electrolyte. Such a nonuniform resistance distribution across the surface would lead to an unnecessary power loss of the battery.

In principle, all glass materials available as fibers are usable for the substrate, for example E-, A-, E-CR-, C-, D-, R-, S- and M-glass.

Preference is given to using fibers of E-, R- or S-glass. The preferred glass varieties contain a low level of BaO, $Na_2O$ or $K_2O$. Preferably the preferred glass varieties contain less than 5% by weight and most preferably less than 1% by weight of BaO, less than 5% by weight and most preferably less than 1% by weight of $Na_2O$ and less than 5% by weight and most preferably less than 1% by weight of $K_2O$. It can be advantageous for the fibers to be made of glass varieties containing none of the compounds BaO, $Na_2O$ or $K_2O$, for example E-glass, since such glass varieties are more stable to the chemicals used as electrolytes.

In a particularly preferred embodiment of the separator according to the invention, the substrate comprises fibers or filaments, particularly preferably glass fibers or glass filaments of E- or S-glass coated with $SiO_2$, $Al_2O_3$, $TiO_2$ or $ZrO_2$ or with mixtures thereof.

When the separator according to the invention comprises a substrate composed of a glass fiber textile, for example a woven, felt or nonwoven glass fiber fabric, these have preferably been produced from threads having a linear density of not more than 20 tex (mg/m), preferably from threads having a linear density of not more than 10 tex and most preferably from threads having a linear density of not more than 5.5 tex.

Most preferably, the substrate comprises a glass fiber fabric woven from threads having a linear density of 5.5 or 11 tex. The individual filaments or fibers of such threads have a diameter of 5 to 7 μm for example. The woven glass fiber fabric which is preferably used as a support has from 5 to 30 weft threads/cm and from 5 to 30 warp threads/cm, preferably from 10 to 30 weft threads/cm and from 10 to 30 warp threads/cm and most preferably from 15 to 25 weft threads/cm and from 15 to 25 warp threads/cm. The use of such glass wovens ensures that the separator is sufficiently strong while possessing sufficient substrate porosity.

The separator of the invention comprises a porous electrically insulating coating. The porosity of the separator is preferably in the range from 10% to 50%, more preferably in the range from 15% to 50% and particularly preferably in the range from 25% to 40%. The coating on and in the substrate comprises an oxide of the metals Al, Zr, Si, Sn, Ce and/or Y, preferably an oxide of the metals Al, Si and/or Zr.

The separators according to the invention may have a breaking strength of greater than 5 and preferably of 20 to 500 N/cm and most preferably of greater than 50 N/cm. The separators according to the invention are preferably bendable around a radius of down to 500 mm, more preferably down to 100 mm, more preferably down to 25 mm and most preferably down to 5 mm without damage. The high breaking strength and the good bendability of the separator according to the invention has the advantage that changes in electrode geometry which occur in the course of the charging and discharging of a battery can be followed by the separator without the separator being damaged.

The separator according to the invention is preferably obtainable by a process for producing a separator that comprises providing a sheetlike flexible substrate having a multiplicity of openings with a coating on and in said substrate, the material of said substrate being selected from woven or non-woven electrically nonconductive fibers of glass or ceramic or a combination thereof and said coating being a porous electrically insulating ceramic coating.

The coating is preferably applied to the substrate by applying to said substrate a suspension comprising at least one inorganic component comprising a compound of at least one metal, one semimetal or one mixed metal with at least one element of the 3rd to 7th main group and a sol and heating one or more times to solidify said suspension comprising at least one inorganic component on or in or else on and in the support. The process itself is known from WO 99/15262, but not all of the parameters and starting materials, especially electrically nonconductive starting materials, can be used for producing the separator of the invention. The choice of starting materials also dictates certain process parameters which first had to be found for the combinations of materials chosen.

Said suspension is brought onto and into said substrate by printing on, pressing on, pressing in, rolling on, knifecoating on, spreadcoating on, dipping, spraying or pouring on.

The material of the substrate is preferably selected from glass, alumina, $SiO_2$, SiC, $Si_3N_4$, BN, $B_4N$, AlN, sialons or $ZrO_2$.

The material of the substrate can be a woven, nonwoven or felt of electrically nonconductive fibers of the abovementioned materials. In order that a uniform resistance may be obtained in use with an electrolyte, the material of the substrate is preferably a glass fiber fabric made from woven glass fibers.

In principle, all glass materials available as fibers are usable for the substrate, for example E-, A-, E-CR-, C-, D-, R-, S- and M-glass. Preference is given to using fibers of E-, R- or S-glass. The preferred glass varieties contain a low level of BaO, $Na_2O$ or $K_2O$. Preferably the preferred glass varieties contain less than 5% by weight and most preferably less than 1% by weight of BaO, less than 5% by weight and most preferably less than 1% by weight of $Na_2O$ and less than 5% by weight and most preferably less than 1% by weight of $K_2O$. It can be advantageous for the fibers to be made of glass varieties containing none of the compounds BaO, $Na_2O$ or $K_2O$, for example E-glass, since such glass varieties are more stable to the chemicals used as electrolytes.

In a particularly preferred embodiment of the separator according to the invention, the fibers, particularly preferably the E- or S-glass fibers, of the substrate are coated with $SiO_2$, $Al_2O_3$, $TiO_2$ or $ZrO_2$ or mixtures thereof.

Such a coating can be applied for example by applying tetraethyl orthosilicate (TEOS) to the fibers, individually or in the form of woven fabric, felt or nonwoven fabric, drying the TEOS and then baking the TEOS at from 400 to 500° C., preferably at from 430 to 470° C. and most preferably at from 445 to 455° C. The baking leaves silicon dioxide behind as a residue on the fiber surface. It has been determined that fibers treated in this way are substantially more useful as a substrate material than untreated fibers, since the subsequent coating has substantially better adhesion on the treated fibers and hence the long-term stability but also the bendability of the separator is distinctly improved. Coatings with $ZrO_2$ or $Al_2O_3$ can be applied to the fiber surface in the same way, in which case zirconium acetylacetonate in ethanol is an example of a useful starting material for producing a $ZrO_2$ coating and aluminum ethoxide in ethanol is an example of a useful starting material for producing an $Al_2O_3$ coating.

When the substrate is composed of a glass fiber textile, for example a woven glass fiber fabric, such fabrics have preferably been produced from threads having a linear density of not more than 20 tex (mg/m), preferably from threads having a linear density of not more than 10 tex and most preferably from threads having a linear density of not more than 5.5 tex. Preferred fiber when using a felt or nonwoven glass fiber fabric has a thickness of 5 to 10 μm, most preferably 5 to 7 μm. Most preferably, the substrate comprises a glass fiber fabric woven from threads having a linear density of 5.5 or 11 tex.

The individual filaments of the threads have a diameter of 5 to 7 μm for example. The woven glass fiber fabric which is preferably used as a substrate has from 5 to 30 weft threads/cm and from 5 to 30 warp threads/cm, preferably from 10 to 30 weft threads/cm and from 10 to 30 warp threads/cm and most preferably from 15 to 25 weft threads/cm and from 15 to 25 warp threads/cm. The use of such glass wovens ensures that the separator is sufficiently strong while possessing sufficient substrate porosity.

It has also been determined, when using commercial glass fiber textiles, especially glass fiber nonwovens, glass fiber felts or glass fiber wovens, that removal of the size applied to the fibers in the course of the manufacturing process of the glass fiber textile has a substantial influence on the strength of the glass fiber textile. The size is customarily removed by heating the glass fiber textile, especially a woven glass fiber fabric, to 500° C. and then thermally treating the textile at >300° C. for several hours to days. It has been determined that, surprisingly, a glass fiber textile which has been treated in this way is substantially more brittle than a glass fiber textile which still has the size. However, the coating according to the invention is very difficult to apply atop and into a sized glass fiber textile substrate, since the coating according to the invention has worse adhesion to the textile because of the size. It was found that, surprisingly, burning off the size at below 500° C., preferably below 450° C., in the course of 2 min and preferably in the course of 1 min and subsequent treatment with TEOS as described above is sufficient to ensure a more durable coating of the glass fiber textile, especially of the woven glass fiber fabric, coupled with sufficiently good mechanical properties. Removal of the size using solvents or detergent mixtures in water is likewise possible under particular conditions.

The suspension used for preparing the coating comprises at least one inorganic component and at least one sol, at least one semimetal oxide sol or at least one mixed metal oxide sol or a mixture thereof, and is prepared by suspending at least one inorganic component in at least one of these sols.

The sols are obtained by hydrolyzing at least one compound, preferably at least one metal compound, at least one semimetal compound or at least one mixed metal compound using at least one liquid, solid or gas. It can be advantageous to use for example water, alcohol or an acid as a liquid, ice as a solid or water vapor as a gas, or at least a combination of these liquids, solids or gases. It can similarly be advantageous for the compound to be hydrolyzed to be introduced into alcohol or an acid or a combination thereof prior to hydrolysis. The compound to be hydrolyzed is preferably at least one metal nitrate, metal chloride, metal carbonate, metal alkoxide compound or at least one semimetal alkoxide compound, particularly preferably at least one metal alkoxide compound, one metal nitrate, one metal chloride, one metal carbonate or at least one semimetal alkoxide compound selected from the compounds of the elements Zr, Al, Si, Sn, Ce and Y or the lanthanoids and actinoids, for example zirconium alkoxides, e.g. zirconium isopropoxide, silicon alkoxides, or a metal nitrate, for example zirconium nitrate.

It can be advantageous to effect the hydrolysis of the compounds to be hydrolyzed with at least half the molar ratio of water, water vapor or ice, based on the hydrolyzable group of the hydrolyzable compound.

The hydrolyzed compound can be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof.

Not just sols prepared as described above can be used, but also commercially available sols, for example zirconium nitrate sol or silica sol.

It can be advantageous to suspend in at least one sol at least one inorganic component having a particle size of 1 to 10 000 nm, preferably of 1 to 10 nm, 10 to 100 nm, 100 to 1000 nm or 1000 to 10 000 nm, more preferably 250 to 1750 nm and most preferably 300 to 1250 nm. The use of inorganic components having a particle size of 300 to 1250 nm provides a separator possessing particularly useful flexibility and porosity.

Preference is given to suspending an inorganic component comprising at least one compound selected from metal compounds, semimetal compounds, mixed metal compounds and metal mixed compounds with at least one of the elements of the 3rd to 7th main group or comprising at least a mixture of these compounds. Particular preference is given to suspending at least one inorganic component comprising at least one compound of the oxides of the transition group elements or the elements of the 3rd to 5th main group, preferably oxides selected from the oxides of the elements Sc, Y, Zr, Nb, Ce, V, Cr, Mo, W, Mn, Fe, Co, B, Al, In, TI, Si, Ge, Sn, Pb and Bi, for example $Y_2O_3$, $ZrO_2$, $Fe_2O_3$, $Fe_3O_4$, $SiO_2$, $Al_2O_3$.

The mass fraction of the suspended component is preferably 0.1 to 500 times, more preferably 1 to 50 times and most preferably 5 to 25 times that of the sol used.

It is possible to optimize the cracklessness of the separator according to the invention through suitable choice of the particle size for the suspended compounds as a function of the size of the pores, holes or intermediate spaces in the substrate, but also through the layer thickness of the separator according to the invention and also through the ratio of the sol/solvent/metal oxide fractions. The type and size of the suspended compound used is decisive for the properties of the separator. The particle size fixes directly the average pore radius and hence the resistance of the electrolyte-wetted separator. The type of compound used is decisive for the wettability of the separator by the electrolyte. The better the wettability of the separator, the better the separator is suitable for use as a separator. In addition, this separator can be adapted to the particular electrolyte used by targeted modification of the surface. It is thus possible to custom tailor the properties.

The coating according to the invention is applied to the substrate by solidifying the suspension in and on the substrate. According to the invention, said suspension in and in said substrate is solidified by heating to 50 to 1000° C. In a particular embodiment of the process according to the invention, the suspension present on and in the support is solidified by heating to 50 to 100° C., preferably by heating to 300 to 700° C. and most preferably by heating to 350 to 390° C., 400 to 440° C., 450 to 490° C., 500 to 540° C., 550 to 590° C. or 600 to 650° C. It can be advantageous to heat at 50 to 100° C. for 10 min to 5 hours or to heat at 100 to 800° C. for 1 second to 10 minutes. The heating of the suspension to solidify it is particularly preferably carried out at 300 to 700° C. for 0.5 to 2 min and preferably from 0.75 to 1.5 min. The heating of the suspension to solidify it is most preferably carried out at 400 to 440° C. for 1.5 to 1 min, at 450 to 490° C. for 1.4 to 0.9 min, at 500 to 540° C. for 1.3 to 0.8 min and at 550 to 590° C. for 1.2 to 0.7 min.

The composite can be heated according to the invention using heated air, hot air, infrared radiation or microwave radiation.

The process according to the invention can be carried out for example by unrolling the substrate off a roll, passing it at a speed of 1 m/h to 2 m/s, preferably at a speed of 0.5 m/min to 20 m/min and most preferably at a speed of 1 m/min to 5 m/min through at least one apparatus which applies the suspension atop and into the support and at least one further apparatus whereby the suspension is solidified on and in the support by heating, and rolling the separator thus produced up on a second roll. This makes it possible to produce the separator according to the invention in a continuous process.

Separators according to the invention can be used as separators in batteries. When the separator is used according to the invention as a separator in batteries, the separator is customarily placed between the anode and the cathode in the electrolyte-saturated form.

The separator according to the invention is suitable for secondary (rechargeable) lithium batteries. The separator according to the invention is useful inter alia as a separator in batteries utilizing the system $Li/LiAlCl_4 \times SO_2/LiCoO_2$. These batteries have a lithium cobalt oxide electrode (positive mass) into which lithium ions can reversibly intercalate and de-intercalate (intercalation electrode). As the system charges, the lithium ions de-intercalate from the intercalation electrode and are deposited metallically, generally dendritically, on a current collector (negative mass). It will be appreciated that other lithium battery systems are similarly achievable with the separator according to the invention. Such as, for example, systems with lithium manganese oxide or lithium nickel oxide as intercalation electrodes, with carbon materials as negative mass which reversibly intercalate the lithium, and other electrolytes, such as $LiPF_6$ and the like.

The separator according to the invention is, however, not limited to such battery systems, but can also be used for example in systems such as nickel metal hydride, nickel-cadmium or lead accumulators.

The separator according to the invention is particularly useful in battery systems having relatively high permitted operating temperatures, for example lithium batteries, in the automotive sector. As mentioned at the beginning, the use of separators according to the invention makes it possible to return braking energy without interruption, since there is no risk of adverse effects on the separator of the high temperature occurring in the course of the feeding. As a result, the entire braking energy can be fed into the battery and not just a part as in the case of polymeric separators.

The separators according to the invention are similarly useful in batteries having a fast charging cycle. By virtue of the high thermal stability of the separator according to the invention, a battery equipped with this separator has a distinctly faster charging cycle. This is a distinct advantage when thus equipped batteries are used in electric vehicles, since they no longer have to be charged for more than 12 hours or even longer and instead charging is feasible within distinctly shorter periods.

Various chemical and engineering requirements can be met by adapting the starting materials or by aftertreating the ceramic layer. For instance, a hydrophilic or hydrophobic coating can be produced by aftertreatment or by reaction with appropriate chemical groups which are known to one skilled in the art.

The nonlimiting examples which follow illustrate the present invention.

EXAMPLE 1.1

A glass beaker is charged with 300 g of DM water together with 50 g of ethanol and 1.2 g of zirconium acetylacetonate. 280 g of $Al_2O_3$ (ct 3000 from Alcoa, Ludwigshafen) are then added a little at a time with stirring. The suspension thus obtained is stirred for about 24 h. 150 g of zirconium sol (from MEL) are then added and the whole system is thoroughly stirred. Thereafter, the sol can be processed into a membrane.

EXAMPLE 1.2

A glass beaker is charged with 300 g of DM water together with 50 g of ethanol and 1.2 g of zirconium acetylacetonate. 280 g of $Al_2O_3$ (MR 32 from Martinswerke) are then added a little at a time with stirring. The suspension thus obtained is stirred for about 24 h. 150 g of zirconium sol are then added and the whole system is thoroughly stirred. Thereafter, the sol can be processed into a membrane.

EXAMPLE 1.3

70 g of tetraethoxysilane are hydrolyzed with 20 g of water and peptized with 20 g of 25% nitric acid. This solution is stirred until clear and after addition of 70 g of amorphous silica (Aerosil 90 from Degussa) is stirred until the agglomerates have dissolved; the suspension is subsequently used.

EXAMPLE 1.4

A glass beaker is charged with 300 g of DM water together with 50 g of ethanol and 1.2 g of zirconium acetylacetonate. 450 g of $Al_2O_3$ (ct 1200 from Alcoa, Ludwigshafen) are then added a little at a time with stirring.

The suspension thus obtained is stirred for about 24 h. 150 g of zirconium sol (from MEL) are then added and the whole system is thoroughly stirred.

Thereafter, the sol can be processed into a membrane.

EXAMPLE 1.5

100 g of silica sol (Levasil 200 from Bayer AG) were stirred with 180 g of M07 aluminum oxide from Sumitomo Chemical until the agglomerates had dissolved. The suspension can then be used.

EXAMPLE 2.1

A glass fiber fabric woven from 11 tex yarns (S2-glass from AGY) with 10 to 30 warp threads/cm and 10 to 30 weft threads/cm was treated at 450° C. in the presence of atmospheric oxygen for 1 min to burn off the size. The fabric was sprayed with a TEOS solution consisting of 1.5% of pre-condensed TEOS in ethanol and the solution was subsequently dried at 50° C. After drying, the fabric was treated once more at 450° C. in the presence of atmospheric oxygen for 1 min. This provided a silica-coated glass fiber fabric. (The same procedure can be used when coating with $ZrO_2$ (using zirconium acetylacetonate in ethanol) and $Al_2O_3$ (using aluminum ethoxide in ethanol), both from Merck.)

EXAMPLE 2.2

Example 2.1 was repeated using a fabric woven from a 5.5 tex yarn (E-glass from AGY) with 5 to 30 warp threads/cm and 5 to 30 weft threads/cm and a mixture of 1% TEOS and 0.5% of titanium tetraisopropoxide (from Merck). This provided a distinctly thinner glass fabric coated with an oxide mixture.

EXAMPLE 2.3

A fabric as from example 2.1 was desized by burning off for 1 min in the presence of atmospheric oxygen and subsequent heat treatment at 300° C. for 4 days. This provided a glass fiber fabric without size.

EXAMPLE 2.4

A fabric as from example 2.2 was desized by burning off for 1 min in the presence of atmospheric oxygen and subsequent heat treatment at 300° C. for 4 days. This provided a glass fiber fabric without size.

EXAMPLE 3.1

A suspension according to example 1.1 is knife coated onto a fabric as per example 2.1 and dried in the course of 7 sec by blowing with hot air at 450° C. This provided a sheetlike separator which was bendable down to a radius of 10 mm without damage. The Gurley number of this separator, which had a pore size of about 100 nm, was 15.

EXAMPLE 3.2

A suspension according to example 1.2 is knife coated onto a fabric as per example 2.3 and dried in the course of 7 sec by blowing with hot air at 450° C. This provided a sheetlike separator which was bendable down to a radius of 10 mm without damage. The Gurley number of this separator, which had a pore size of about 80 nm, was 19.

EXAMPLE 3.3

A suspension according to example 1.3 is knife coated onto a fabric as per example 2.4 and dried in the course of 7 sec by blowing with hot air at 450° C. This provided a sheetlike separator which was bendable down to a radius of 25 mm without damage. The Gurley number of this separator, which had a pore size of about 50 nm, was 33.

EXAMPLE 3.4

A suspension according to example 1.4 is knife coated onto a fabric as per example 2.3 and dried in the course of 7 sec by blowing with hot air at 450° C. This provided a sheetlike separator which was bendable down to a radius of 25 mm without damage. The Gurley number of this separator, which had a pore size of about 250 nm, was 5.

EXAMPLE 3.5

A suspension according to example 1.1 is knife coated onto a fabric as per example 2.2 and dried in the course of 7 sec by blowing with hot air at 450° C. This provided a sheetlike separator which was bendable down to a radius of 10 mm without damage. The Gurley number of this separator, which had a pore size of about 100 nm, was 12.

What is claimed is:

1. A separator comprising
   a flexible substrate in sheet form
   having a multiplicity of openings and
   having a coating on and in said substrate,
   the material of said substrate being woven electrically nonconductive fibers of glass and said coating being a porous electrically insulating ceramic coating, wherein the substrate is a woven glass fiber fabric comprising woven fibers or filaments which has been produced from 2 to 20 tex yarns and has from 5 to 30 weft threads/cm and from 5 to 30 warp threads/cm, and the separator has a thickness of less than 100 μm.

2. The separator of claim 1, wherein the separator has a thickness of less than 50 μm.

3. The separator of claim 1, wherein said fibers or filaments are at least one glass selected from the group consisting of E-, R- and S-glass.

4. The separator of claim 3, wherein said filaments are coated with $SiO_2$, $ZrO_2$, $Al_2O_3$ or mixtures thereof.

5. The separator of claim 3, wherein said woven glass fiber fabric was produced from 5.5 or 11 tex yarns.

6. The separator of claim 1, wherein said coating on and in said substrate comprises an oxide, nitride or carbide of the metals Al, Zr, Si, Sn, Ce, Mg, Hf, B and/or Y.

7. The separator of claim 1, wherein the separator has a breaking strength of 5 N/cm to 500 N/cm.

8. The separator of claim 1, wherein the separator is bendable around a radius down to 100 mm without damage.

9. A battery, which comprises the separator as claimed in claim 1.

10. A process for producing a separator as claimed in claim 1, the process comprising
    providing a flexible substrate in sheet form having a multiplicity of openings with a coating on and in said substrate,
    the material of said substrate being a woven fabric comprising woven glass fibers which has been produced from threads having a linear density of not more than 20 tex and has from 5 to 30 weft threads/cm and from 5 to 30 warp threads/cm and
    said coating being a porous electrically insulating ceramic coating.

11. The process of claim 10, wherein said coating is provided by applying to said substrate a suspension comprising at least one inorganic component comprising a compound of at least one metal, one semimetal or one mixed metal with at least one element of the $3^{rd}$ to $7^{th}$ main group and a sol and heating one or more times to solidify said suspension comprising at least one inorganic component on or in or else on and in the support.

12. The process of claim 11, wherein said suspension is brought onto and into said substrate by printing on, pressing on, pressing in, rolling on, knifecoating on, spreadcoating on, dipping, spraying or pouring on.

13. The process of claim 10, wherein said suspension, which comprises at least one inorganic component and at least one sol, at least one semimetal oxide sol or at least one mixed metal oxide sol or a mixture thereof, is prepared by suspending at least one inorganic component in at least one of these sols.

14. The process of claim 13, wherein said sols are obtained by hydrolyzing at least one metal compound, at least one semimetal compound or at least one mixed metal compound using water, water vapor, ice, alcohol or an acid or a combination thereof.

15. The process of claim 14, wherein said metal compound hydrolyzed is at least one metal alkoxide compound or at least one semimetal alkoxide compound selected from the alkoxide compounds of the elements Zr, Al, Si, Sn, Ce and Y or at least one metal nitrate, metal carbonate or metal halide selected from the metal salts of the elements Zr, Al, Si, Sn, Ce and Y.

16. The process of claim 13, wherein the mass fraction of said suspended component is 0.1 to 500 times that of the sol used.

17. The process of claim 10, wherein said inorganic component suspended is at least one oxide selected from the oxides of the elements Sc, Y, Zr, V, Cr, Nb, Mo, W, Mn, Fe, Ce, Co, B, Al, In, Ti, Si, Ge, Sn, Pb and Bi.

18. The process of claim 10, wherein said suspension on and in said substrate is solidified by heating to 50 to 1000° C.

19. The process of claim 18, wherein said heating is carried out at 50 to 100° C. for 10 min to 5 hours.

20. The process of claim 19, wherein said heating is carried out at 100 to 800° C. for 1 second to 10 minutes.

* * * * *

UNITED STATES PATENT AND TRADEMARK OFFICE
CERTIFICATE OF CORRECTION

PATENT NO. : 7,351,494 B2  Page 1 of 1
APPLICATION NO. : 10/487245
DATED : April 1, 2008
INVENTOR(S) : Hennige et al.

It is certified that error appears in the above-identified patent and that said Letters Patent is hereby corrected as shown below:

On the title page, Item (75), the Inventors should read:

-- Volker Hennige, Duelmen (DE);
Gerhard Hoerpel, Nottuln (DE);
Christian Hying, Rhede (DE) --

Signed and Sealed this

Twenty-fourth Day of June, 2008

JON W. DUDAS
*Director of the United States Patent and Trademark Office*